United States Patent Office 3,034,131
Patented May 15, 1962

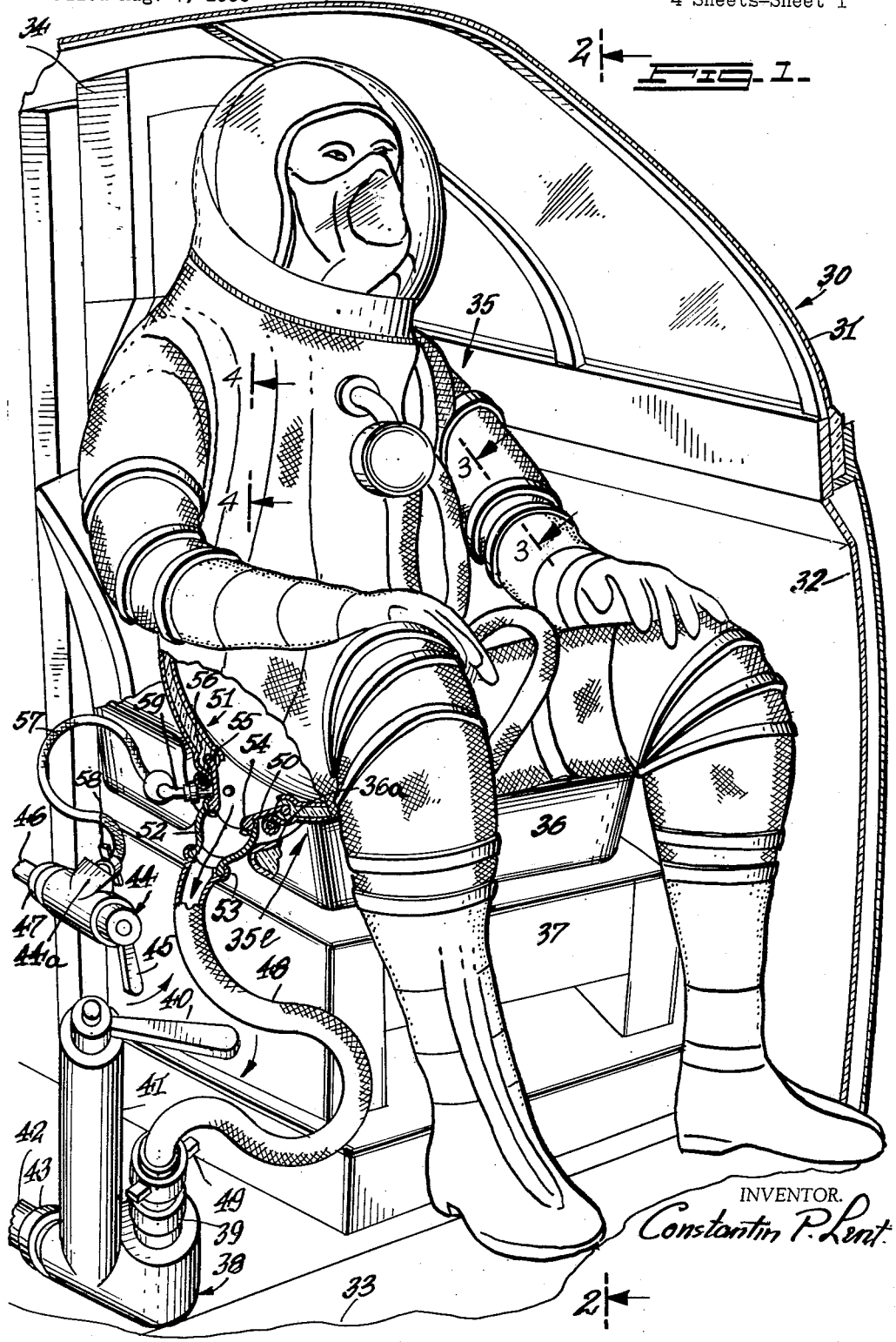

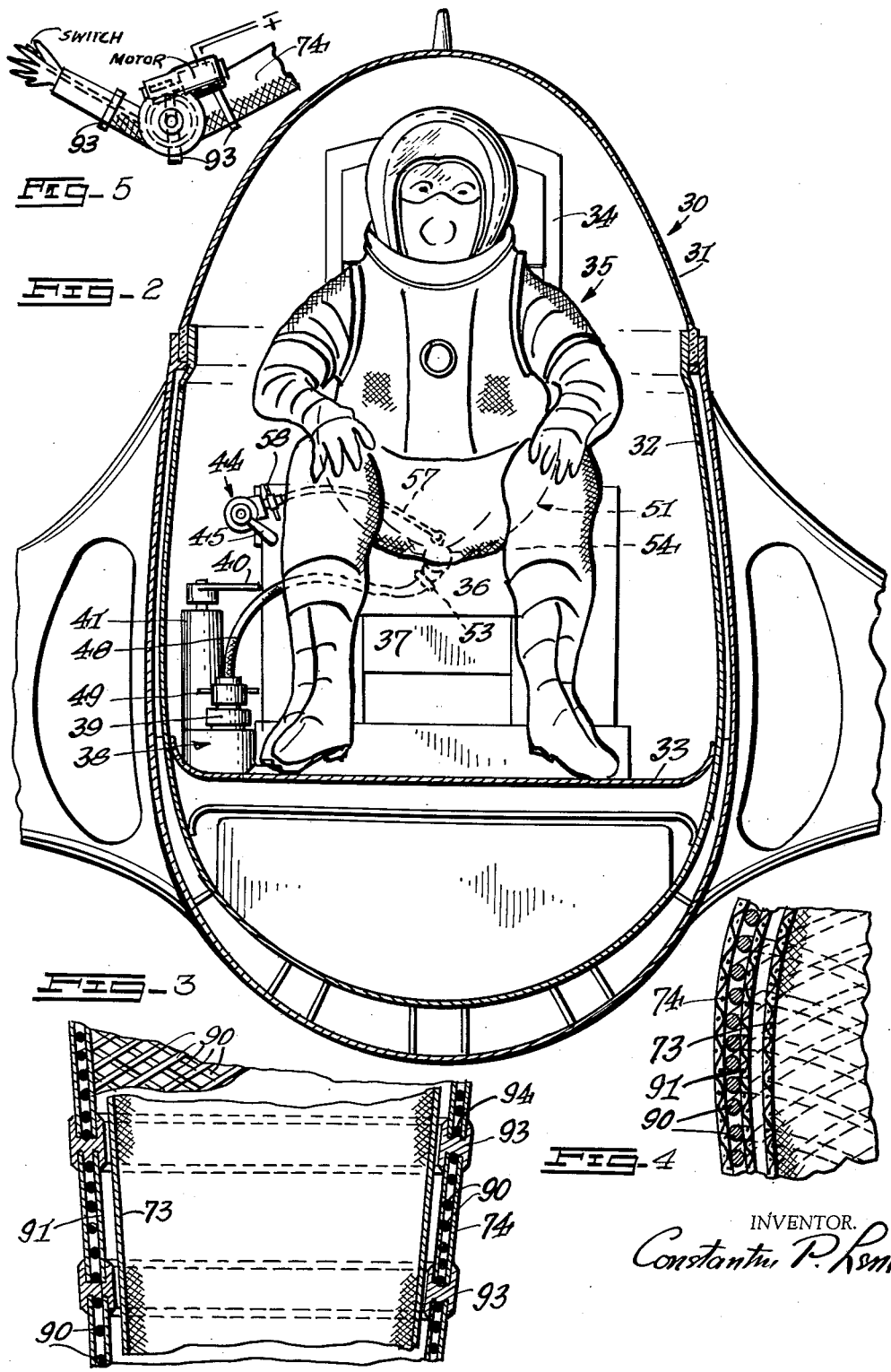

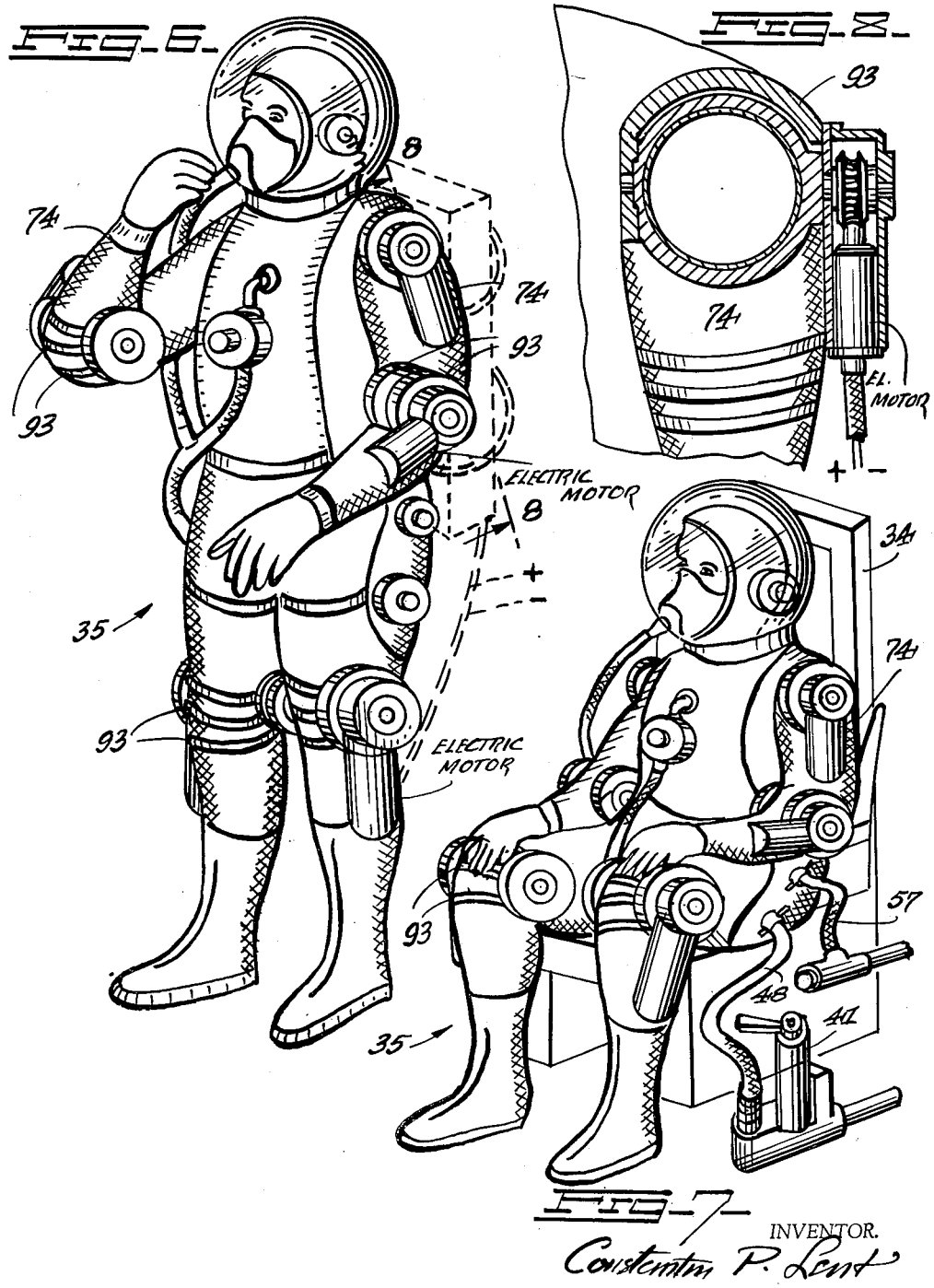

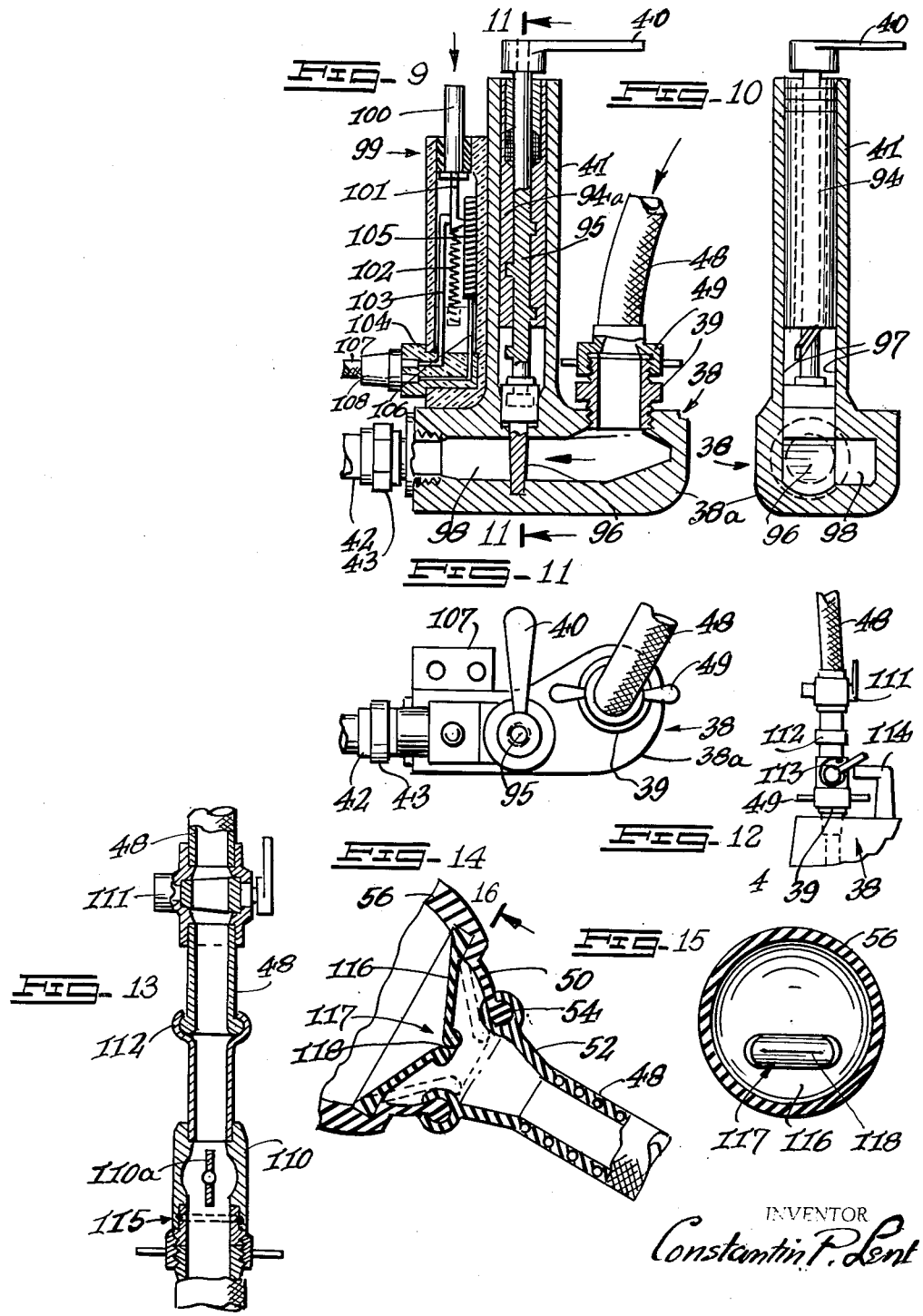

3,034,131
MOBILE SPACE SUIT
Constantin Paul Lent, 50 E. 42nd St., New York, N.Y.
Filed Aug. 7, 1956, Ser. No. 602,669
3 Claims. (Cl. 2—2.1)

This invention relates to aviation suits for high altitudes and more particularly to aviation suits which are inflatable to withstand internal air pressure, and which may be provided with a comfort unit built directly into the suit itself, or being carried along as an accessory.

In the last decade aviation has progressed at great pace. While only ten years ago flying speeds of two to four hundred m.p.h., and altitudes of twenty thousand feet were considered acrobatic feats, present supersonic speeds, and altitudes of eighty thousand feet and even more are not only possible but are harbingers of greater things to come. In addition to speed and altitude, duration of flying time has increased considerably. While only two years ago jet pilots were not required to fly more than three hours at the most, now longer flights are required of them with the end result that the pilot may remain imprisoned in the craft from five to ten hours, and possibly for many more hours in the future.

The air at high altitudes is rarified and its pressure is low. For comfort, if possible, the pilot must breath air at atmospheric pressure with a somewhat higher oxygen content (also some other gases such as helium). In the past pilots were required to wear a conventional aviation suit that could be zipped over the pilot's uniform in a minute or two; the plane's cabin was of course pressurized. Tests have shown that in place of a conventional aviation suit (of the old design) it is more efficient and safer to permit the aviator to wear a pressurized, one piece air tight suit, dispensing entirely with the features of the pressurized cabin, if possible. Such a one piece air tight suit is further desirable to permit the pilot to bail out at higher altitudes from a cabin that is not pressurized. These requirements (for an aviation suit containing its own supply of air at atmospheric pressure) necessitates the redesign of the conventional aviation suit and the development of a pressurized one piece suit of high efficiency. The latter must be provided with an air-tight helmet, which the aviator may don independently of the aviation suit. Further, because of lower pressures at high altitudes, it is desirable to make the suit of double lining and to introduce pressurized air between the two linings. This feature has the advantage of providing a static force (pressure) over the pilot's entire body which if not so supported may tend to inflate in the lower pressures of higher altitudes. Circulating the pressurized air through the inside of the suit prevents the pilot from overheating (due to greater temperatures developed by air friction at higher altitudes at supersonic speeds).

The requirements of ever greater speeds and higher altitudes have, of course, brought along with them greater demands upon the flying personnel and the aviation engineer alike (the latter has to cope with the problem of designing equipment to meet the aviator's needs) and the greater time element has developed additional design problems in its wake which must be solved before even greater speeds, altitudes and longer flying time are at all possible. Greater speeds, higher altitudes and longer flying time need better aviation garments and suits for the pilot, who must be made to feel comfortable if for nothing else but the psychological effect produced on him at high altitudes and the force of gravity. While in the past, the pilot was required to wear garments which he was able to put on and zip fast unassisted, and which he could shed by simply zipping them off, now the pilot is required to wear a garment or a suit which may be pressurized for higher altitudes and which as a consequence thereof is made air-tight and is hard to put on or to take off unassisted. This pressurized, one piece feature while it has some advantages has also a number of disadvantages. When the pilot felt the need for physical comfort (to urinate or to defecate) in the past he was able to zip the lower portion of his conventional suit open, and to insert a gatherer into which he was able to urinate (no provision for defecation was provided). The pilot cannot do so in the new inflatable suit (it is made of one piece without a zipper). In flights of many hours, the pilot may feel very uncomfortable if no provision is made to permit him to urinate and defecate; especially so when the pilot is forced to fly many hours over enemy territory.

While pressurized suits have been in use for quite some time, they have not been improved to the point to prevent them from bursting at higher altitudes (over eighty thousand feet and possibly one hundred and fifty thousand feet high and in outer space). For the sake of flexibility suits are made of rubber, cloth or a rubber-like fabric reinforced here and there, over the limbs and the arms with reinforcing rings. Such suits have limited value because at higher altitudes, where the air is extremely rare (possibly half a pound per square inch and less) the suit because of the internal pressure and the near vacuum on the outside, may dangerously inflate and then burst. Also, because of the internal pressure, the extremities of the suit (hands and legs) may be hard to flex; the pressure inside the suit keeping the material of the arms and the legs taut and inflexible (like in a saucer balloon) necessitating outside assistance to move.

We are now entering an era when even higher altitudes and greater speeds will be possible, with the pilot being required to remain aloft for extended periods of time. Also, in rocket ships moving at speeds of two to three thousand miles per hour (or even more), the pilot's physical requirements and his natural comforts must be taken under consideration. Before it is too late, it is necessary to plan now ahead of time for improvements in aviation garments and suits which not only may be safe, but also may provide greater comforts. Interstellar navigation (a thing of the very near future) too needs better pilot suits. Such suits may not only be made in one piece, but in a capsule form; a suit made entirely out of steel, aluminum, plastic or all three materials combined. Into such a suit the pilot may be hermetically sealed to operate the various control instruments in the craft electrically or by remote control from the inside of the capsule suit.

Therefore, the main objects of this invention are improvements in the present-day aviation suit to remove some of the above enumerated disadvantages and to provide greater safety, greater flexibility and more comfort for the aviator wearing the improved suit.

Objects

A good high altitude aviation suit must fulfill the following requirements: 1, it must be air-tight; 2, it must withstand high internal pressure of one atmosphere (@ 15 lbs. p.s.i.) or more without inflating or bursting; 3, it must be fitted snugly to an air-tight helmet; 4, it must be equipped with an intake and an exhaust for the breathing air conveniently located in the suit; 5, it must be provided with a device to discharge the products of the pilot's physical elimination; 6, it must have motive means to help the flexing of the limbs and the arms in the suit, and last if not least 7th, the suit must be easy to manipulate in vacuum. All the above enumerated seven requirements must be met in a high altitude aviation suit. While each requirement by itself may be a separate problem, and may be resolved separately, all seven requirements together make for an efficient suit. While each requirement may be an independent invention, all seven must be combined into one to provide an efficient suit of the type disclosed in this application.

One object of this invention is to provide an all enclosed air-tight, flexible aviation suit made of rubber, cloth, plastic and metal and reinforced especially to withstand and to prevent the suit from bursting because of the pressure in the suit (air pressure).

Another object of this invention is to provide a high altitude aviation suit including a defecation comfort cabinet or seat which may be an integral part of the aviation suit or an accessory thereto.

An additional object of this invention is to provide hydraulic, mechanical or electrical means to help moving and flexing the extremities of the suit, the limbs and the arms.

A further object of this invention is to provide a capsule-type suit in which the aviator is hermetically enclosed or sealed and piping connections to the defecation relief seat in the suit.

A still another object of this invention is to provide a high pressure suit made of separate sections; a torso section, two arm sections, two leg sections, a helmet and separate sections to encage the hand and the fingers. All separate sections are mounted together to form the suit.

Further and additional objects will be seen as the description of this specification will proceed.

Referring to the figures:

FIG. 1 shows the pilot in the plane's cabin wearing the inflatable suit embodied in the present invention. A comfort seat is shown in section with the various discharge connections leading thereto and the manually operated valves to operate same.

FIG. 2 is a section taken on the line 2—2 of FIG. 1, showing further details of the inflatable suit in the present invention including the comfort cabinet or unit.

FIG. 3 is a section through one of the limb portions in the suit taken on the line 3—3 of FIG. 1, showing the manner in which stiffening material is applied in the lining, in the leg and the arm portions of the inflatable suit.

FIG. 4 is a partial section through a portion of the suit taken on the line 4—4 of FIG. 1, showing the manner in which stiffening is applied to the fabric of the suit to prevent the suit from inflating and bursting.

FIG. 5 shows the manner of operating the various extremities of the flexible suit from an outside source; mechanical, electrical or hydraulic.

FIG. 6 shows the manner in which the high pressure suit is being worn and the relative position of the various separate sections and the servo motors which are being utilized to help move the extremities of the suit by remote control.

FIG. 7 shows the aviator wearing the suit in seating position.

FIG. 8 is a section on the line 8—8 in one of the arm links in FIG. 6, showing the manner in which a servo motor is mounted in the suit.

FIG. 9 is a vertical sectional view through the discharge valve shown in FIGS. 1 and 2, indicating the position of the discharge canal in the valve and the electric control switch to vary the force of suction.

FIG. 10 is a section taken on the line 11—11 of FIG. 9.

FIG. 11 is a top elevational view of FIG. 9.

FIG. 12 shows the manner in which the automatic valve is kept open with the tube secured to the discharge end of the comfort unit in the suit.

FIG. 13 is a section through the discharge tube showing two discharge valves, one manually operated and the other automatically operated.

FIG. 14 is a modification of the discharge dish shown in FIG. 1, with a membrane valve intented to keep the discharge opening closed when the unit is not being used.

FIG. 15 is a section on the line 16—16 of FIG. 14.

*Detailed Description*

Referring more particularly to FIG. 1, numeral 30 indicates the cabin of a conventional propeller driven aeroplane, jet plane or a bomber with its retractable hood 31, the plane's fuselage 32 and the cabin's floor panel 33. The jettisoned seat 34 is mounted directly over the floor panel 33 with its jettisoning mechanism (not shown) ready to eject the aviator if it is necessary to bail out. The aviator, in the high pressure inflatable suit 35 may be seated upon the cushioned seat 36 held to the supporting frame of the stool 37.

More particularly referring to the comfort seat contained in the aviator's suit, a discharge valve 38, with a connecting coupling 39 and a handle 40 to operate the valve stem 41, is mounted upon the floor 33 directly besides the aviator's stool 37. With the piping 42 connected by means of its connecting coupling 42 to the other side of the valve 38, this completes the assembly of the discharge valve 38. Its operation will be described in greater detail hereinafter. Right above the discharge valve 38 and besides the aviator's stool 37, there is mounted a secondary valve 44 which is independently operated by means of the handle 45. The valve 44 is connected to a container or a bottle containing a disinfecting fluid or water (not shown). The valve 44 is by means of the piping 46 and its connecting pipe 47 connected to the water of chemical source above described.

From FIG. 1, it may be seen that the discharge valve 38 is connected by means of the flexible pipe or tube 48 and its connecting flange 39 directly to the lower portion $35_1$ of the aviation suit 35, while the opposite end thereof leads to and is secured to the defecation dish 50, or the discharge well of the comfort or defecation unit 51. The flexible pipe 48 is connected by means of the collection dish 52 and its reinforced lip 53 to the dish 50 which is built into one end of the collection dish 52. At the other end the dish 52 by means of the reinforced lip 54 is connected to the dish 50. The dish 50 has a reinforced lip 55 which is mounted and held within the flexible rubber-like material forming the body of the defecation seat 56. Referring to the supply valve 44, which serves to supply the seat with a disinfectant, it includes a machined surface 44a to permit mounting a secondary flexible pipe connection 57. This task is accomplished by means of the manually operated flange connector 58. The other end 59 of the flexible pipe 57, by means of the secondary flange is connected to the dish 50. The operation of both valves will be described hereinafter.

The cushioned seat 36 may be provided with a grooved in portion 36a into which the defecation comfort seat, with its defecation seat 50, may be fitted for convenience. FIG. 2, which is a section on the line 2—2 of FIG. 1, indicates at some greater detail the manner in which the aviator is seated on the stool 37, in relation to the various pipe connections leading from and to the valves 38 and 44 respectively leading to the defecation seat in the aviation suit 35.

To withstand the internal air pressure, the suit may be additionally reinforced to prevent bursting. Such an arrangement is illustrated in the fragmentary views shown in FIGS. 3 and 4. FIG. 3 is a section taken on the line 3—3 of FIG. 1, showing a possible reinforced construction in one of the flexible links in the suit. In this case the outer lining 74 is reinforced by means of the reinforced fabric 90 formed of alternate strands of wire mesh (metallic or plastic); the wires in the mesh running on a bias, or oblique. The suit may preferably contain a middle lining 91, mounted between the inner and outer linings in the suit. A number of ring-shaped members 93 may serve the purpose of connecting together and reinforcing the arm and limb sections of the suit.

From FIGS. 3 and 4 it may be seen that the various linings and their sections of reinforced fabric are fitted within grooves 94 which are formed circumferentially and around the lower and upper portions of the ring-shaped members. These grooves are sufficiently deep to receive the outer margins of the various sections. The walls of the grooves at assembly are subjected to high pressure to press the margins of the linings in the grooves in a tight fit, thus providing a permanent air-tight and water-tight fit which will not give under pressure. The three linings and their reinforcing fabric, while providing a measure of rigidity to the suit and resistance against bursting, notwithstanding retain the necessary flexibility to permit the aviator to move about freely and to flex the arms and the limbs. FIG. 4 is a section on the line 4—4 of FIG. 1, showing the construction of the suit in the torso section thereof. In this case, as in the case of the arms and limbs, the torso section may be similarly constructed of three separate linings: the outer lining, the inner lining and the middle lining with reinforcing mesh wire mounted between the outer and the middle lining. When pressure is applied (between the inner and the middle lining) the inner lining (contacting the aviator's body) will provide an evenly distributed pressure over his entire body. This pressure will represent the difference between atmospheric pressure and the near vacuum in the cabin. The wire mesh (mounted between the outer and the middle lining) will support the middle lining and prevent expansion of the fabric. In this fashion the pilot is not subjected to the danger of low pressure at high altitudes and the inherent flexibility of the wire mesh permits the free movement of the pilot in the suit.

FIG. 5 shows the manner in which the arms and the limbs of the inflatable suit may be moved by means of a motive source provided from the outside of the suit. In the main this may be accomplished by a worm gear secured to one section of one of the links in the suit, and a worm operated by a shaft driven by an electric motor. The motor in question is housed within the mounting which is secured to a section on the inflatable suit. By means of wires connecting the motor to a power source (located in the suit or in the cabin of the plane) the motor may be driven. A switch is turned on and off by the aviator at will to start or to stop the operation of the motor. Such a switch may be incorporated near the pilot's hand and may be operated by his hand, or separate switches may be provided to be operated by touch control. In this manner at the will of the operator the arm and leg sections of the suit may be moved. The same results may be accomplished by hydraulic means. While it is not necessary to provide such external motive force to operate the extremities of the suit in aeroplanes traveling at low altitudes, with planes reaching higher altitudes (and especially in rocket vehicles) when the outside pressure is very low, mechanical force must be available to flex the extremities against the resistance offered by atmospheric air in the suit which will tend to keep the extremities in the suit taut.

Referring more particularly to FIG. 6, it shows the manner in which, electrically operated servo motors may be mounted to the suit, and the manner in which the extremities may be moved against the pressure (atmospheric pressure) in the suit. In the suit, each arm is provided with two servo motors, the legs with one each. Dotted lines indicate the portable battery to provide current for the motors.

FIG. 7 shows the aviator wearing the suit in seated position, while FIG. 8 is a section on the line 8—8 in FIG. 6 indicating the manner in which a servo motor is mounted, showing the worm and the worm gear. FIG. 8 reads on FIG. 5, which shows diagrammatically the manner in which the servo motor, by means of a worm operates the worm gear. The servo motor is secured to one of the ring-shaped members 93, mounted to the arm section 74.

FIGS. 9, 10 and 11 show the general construction of the discharge valve 38. In the main the valve 38 consists of a casting or a forging 38a fitted with a threaded coupling 29. The flange 49 threads into the coupling 39 to support a flexible discharge pipe 48. The valve 38 is equipped with an upright stem 41 which is provided with a plug 94a holding a shaft 95a. The shaft 95 has a coarse thread fitted into the upright 94 in the valve. At its lower end shaft 95 has a valve member 96 which is free to slide within the valve ways 97 in the casting 38a, when the shaft 95 is turned. The plate valve member 96 is moved by means of the shaft 95 to open the valve 38. The shaft 95 is rotated by means of the manually operated handle 40. The products of elimination, by means of the electric motor operating a vacuum pump (not shown), are discharged from the canal 98 into the valve 38. The regulation of suction produced by the pump (not shown) is accomplished by means of the electric switch (regulating switch, or a rheostat) 99 which is mounted besides the valve 38, at easy reach by the pilot. The regulating switch 99 will automatically regulate the suction, and may be operated to vary the suction at will.

In the main the electric regulating switch 99 consists of a switch or the plunger 100 mounted to slide and to move a switch arm 101; the latter closing a switch contact 103. The contact 103 is electrically connected to the plug 104, with a coil of wire forming the resistor 105, the latter being electrically connected to the plug 104 by the wire 106; the contact 103 and the wire 106 forming the plus and the minus end of the electric circuit. A wire 107 having a plug 108 leads from the electric circuit above described to the motor and the current supply. When the pilot wishes to eliminate, he opens the valve 38 and then presses on the plunger or the switch 100 to start the motor (not shown) to operate the vacuum pump (not shown).

FIGS. 12 and 13 show a modification. In the event the pilot needs to bail out at sea, the flexible discharge pipe 48 may be provided with an automatic cut-off safety valve 110, a manually operated safety valve 111, and an automatic disengagement coupling 112. It may be seen that the valve 110 is provided with a disk 110a which, by means of the coil spring 113 is kept normally closed. The disk 110a is positioned in such a manner as by means of the support 114 to permit the opening of the valve. When the flexible pipe 48 is secured to the coupling 39, the support 114 contacts the underside of the handle which operates the disk 110a, thus allowing the valve to remain open as long as the flexible discharge pipe 48 is connected thereto. Should it be necessary to bail out, the valve 110 will automatically disengage itself (or brake off) at 115. This action will free the coil spring 113 allowing it to close the valve. For additional safety, the pilot has at his disposal a secondary valve 111 which he may shut at will. The closing of the valve 111 will prevent sea water from entering the system should the pilot be forced to bail out at sea. In addition, the shutting of the valve 111 will prevent air from inside the inflated suit to escape. The flexible pipe 48, by means of the connector 112, is permitted a certain amount of side motion, as connector 112 acts in the manner of a swivel joint. When the pilot bails out, the connector 112 disengages from the valve stem 110.

FIG. 14 shows a membrane valve 116 mounted in the discharge well 56. The membrane has a reinforced lip 117 and a discharge 118. The lip 117 is under the influence of vacuum on one side and atmospheric pressure on the other. When the pilot needs to eliminate the lip 117 will open to discharge into the pipe 48. The membrane 116 keeps the discharge opening normally closed, preventing the entry of sea water into the system and the leaking of pressure air from the suit.

While I have shown and described several applications of my invention, I do not wish to limit myself to the features and the operation of my device, but wish to cover all possible designs and modifications thereof, being only limited by the scope of the appended claims.

What I claim is:

1. In a high altitude inflatable aviation suit made of flexible material to withstand internal pressures and to flex freely, said suit including several separate sections joined to flex together comprising a neck section with an air-tight helmet, a torso section joined to the neck section, two arm sections joined to either side of the torso section, and two limb sections joined in the lower end of said torso section; said arm and limb sections made of separate flexible portions each joined to the other sections to flex freely, and motive means to move said separate arm and limb sections against the restraining force produced by the air pressure inside the suit, and means to regulate said motive means to flex freely said sections and at the will of the aviator wearing the suit.

2. In a high altitude inflatable aviation suit made of flexible material to withstand internal pressure and to flex freely having three separate lining layers, an outer layer, an inner layer and a middle layer interposed between the first two, said suit including several separate sections joined to flex together comprising a neck section with an air-tight helmet, a torso section joined to the neck section, two arm sections joined on either side of the torso section, and two limb sections joined in the lower end of said torso section; reinforcement placed between the outer and the middle layers of lining in each and all the various sections of said suit, said reinforcement comprising a wire mesh means cut on the bias; said arm and limb sections made of separate flexible portions each joined to the other sections by solid ring-shaped members to which the three layers of lining including the reinforcement may be fastened to, and motive means to move said separate arm and limb sections against the restraining force produced by the air pressure inside the suit, and means to regulate said motive means to flex freely said sections and at the will of the aviator wearing said suit.

3. The same as in claim 1; and said motive means including an electric motor means, a switch in said suit located adjacent the aviator's hand to be operated by the aviator's fingers, the operation upon said switch connecting and disconnecting said electric motor from an electric current source.

References Cited in the file of this patent

UNITED STATES PATENTS

| | | |
|---|---|---|
| 719,811 | Kent | Feb. 3, 1903 |
| 1,351,955 | Lowry | Sept. 7, 1920 |
| 2,365,779 | Schwab | Dec. 26, 1944 |
| 2,379,497 | Sellmeyer | July 3, 1945 |
| 2,391,282 | Van Orman | Dec. 18, 1945 |
| 2,414,051 | Mallory | Jan. 7, 1947 |
| 2,528,464 | Wilkerson | Oct. 31, 1950 |
| 2,625,160 | Maxim | Jan. 13, 1953 |
| 2,749,558 | Lent et al. | June 12, 1956 |
| 2,762,047 | Flagg et al. | Sept. 11, 1956 |
| 2,834,965 | Flagg et al. | May 20, 1958 |
| 2,893,016 | Zion | July 7, 1959 |
| 2,966,155 | Krupp | Dec. 7, 1960 |

FOREIGN PATENTS

| | | |
|---|---|---|
| 631,695 | Great Britain | Nov. 8, 1949 |